United States Patent
Stuhr et al.

(10) Patent No.: US 8,292,227 B2
(45) Date of Patent: Oct. 23, 2012

(54) AIRCRAFT WINGS HAVING CONTINUOUSLY TAILORED STRUCTURAL STRENGTH

(75) Inventors: Victor Stuhr, Seattle, WA (US); Alan Keith Prichard, Lynwood, WA (US); Joseph R. Olivadoti, Gig Harbor, WA (US)

(73) Assignee: The Boeing Company, Chicago, IL (US)

( * ) Notice: Subject to any disclaimer, the term of this patent is extended or adjusted under 35 U.S.C. 154(b) by 834 days.

(21) Appl. No.: 12/172,230

(22) Filed: Jul. 12, 2008

(65) Prior Publication Data
US 2010/0006700 A1  Jan. 14, 2010

(51) Int. Cl.
  B64C 3/20 (2006.01)
  B64C 3/26 (2006.01)
  B32B 3/28 (2006.01)
(52) U.S. Cl. .............. 244/123.12; 244/123.1; 428/182
(58) Field of Classification Search ............. 244/123.1, 244/123.12, 123.14; 428/181, 182, 595, 428/603
See application file for complete search history.

(56) References Cited

U.S. PATENT DOCUMENTS

| | | | | |
|---|---|---|---|---|
| 1,311,205 A | * | 7/1919 | Belcher | 244/123.12 |
| 1,469,220 A | * | 10/1923 | Kemp | 244/87 |
| 2,241,972 A | * | 5/1941 | Wagner | 244/123.12 |
| 2,262,606 A | * | 11/1941 | Hardman | 244/123.12 |
| 2,645,435 A | * | 7/1953 | Pouit | 244/15 |
| 3,011,602 A | * | 12/1961 | Ensrud et al. | 428/180 |
| 3,388,522 A | * | 6/1968 | Lowes | 244/123.12 |
| 3,470,053 A | | 9/1969 | Rule | |
| 3,507,634 A | * | 4/1970 | O'Driscoll | 428/573 |
| 3,859,832 A | | 1/1975 | Siegwart | |
| 4,344,995 A | * | 8/1982 | Hammer | 428/61 |
| 4,411,380 A | | 10/1983 | McWithey et al. | |
| 4,610,837 A | | 9/1986 | Frey | |
| 4,721,593 A | | 1/1988 | Kowal | |
| 5,670,238 A | * | 9/1997 | Earl et al. | 428/182 |
| 5,735,158 A | | 4/1998 | Brunson | |
| 5,848,765 A | | 12/1998 | Gillespie | |
| 5,882,462 A | | 3/1999 | Donecker et al. | |
| 6,114,050 A | | 9/2000 | Westre et al. | |
| 6,599,645 B2 | * | 7/2003 | Wittebrood | 428/654 |
| RE38,508 E | * | 4/2004 | Wright | 428/623 |
| 6,834,525 B2 | | 12/2004 | Leon et al. | |
| 6,848,233 B1 | * | 2/2005 | Haszler et al. | 52/783.17 |
| 7,415,860 B2 | | 8/2008 | Yamauchi | |

(Continued)

FOREIGN PATENT DOCUMENTS

| | | |
|---|---|---|
| DE | 2718002 A1 | 10/1978 |
| JP | 11099993 A | 4/1999 |
| WO | 2010008922 A1 | 1/2010 |

OTHER PUBLICATIONS

International Search Report, dated Oct. 23, 2009, regarding Application No. PCT/US2009/048894 (WO2010008922), 3 pages.

(Continued)

*Primary Examiner* — Joseph W Sanderson
(74) *Attorney, Agent, or Firm* — Yee & Associates, P.C.

(57) ABSTRACT

The structural strength of an aircraft wing is continuously tailored along its length to closely match continuously varying imposed wing loads. The wing includes upper and lower skins each formed from panels joined together. Each of the skin panels includes a stiffening web sandwiched between and joined to the inner and outer facesheets. The web has a repeating pattern and at least one dimension that continuously varies along the length of the panel.

25 Claims, 10 Drawing Sheets

U.S. PATENT DOCUMENTS

| | | | | |
|---|---|---|---|---|
| 7,566,489 | B2 * | 7/2009 | Starke | 428/178 |
| 7,673,832 | B2 * | 3/2010 | Meister | 244/123.1 |
| 7,851,048 | B2 * | 12/2010 | Brandon et al. | 428/178 |
| 2003/0059581 | A1 * | 3/2003 | Whalen | 428/182 |
| 2004/0093927 | A1 | 5/2004 | Leon et al. | |
| 2010/0009126 | A1 | 1/2010 | Leon et al. | |
| 2010/0193636 | A1 * | 8/2010 | De Vita et al. | 244/123.1 |

OTHER PUBLICATIONS

USPTO Office Action, dated Oct. 7, 2010, regarding U.S. Appl. No. 12/238,389, 11 pages.

Response to Office Action, dated Feb. 4, 2011, regarding U.S. Appl. No. 12/238,389, 18 pages.

USPTO Office Action, dated Apr. 29, 2011, regarding U.S. Appl. No. 12/238,389, 8 pages.

Response to Office Action, dated Jul. 28, 2011, regarding U.S. Appl. No. 12/238,389, 19 pages.

USPTO Office Action, dated Oct. 31, 2011, regarding U.S. Appl. No. 12/238,389, 10 pages.

Response to Office Action, dated Apr. 2, 2012, regarding U.S. Appl. No. 12/238,389, 11 pages.

* cited by examiner

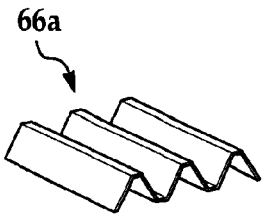
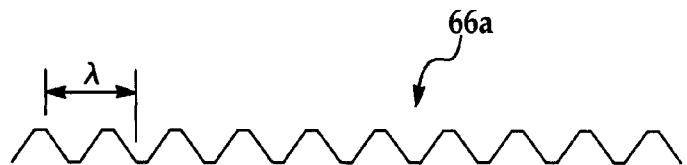
FIG. 7A  FIG. 7B
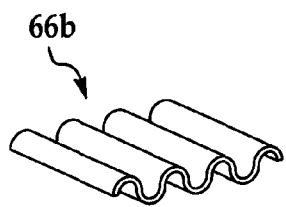
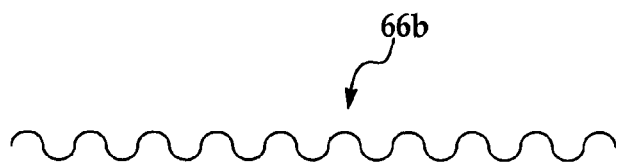
FIG. 8A  FIG. 8B
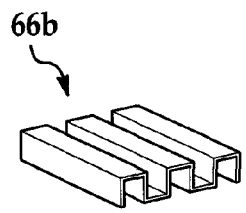
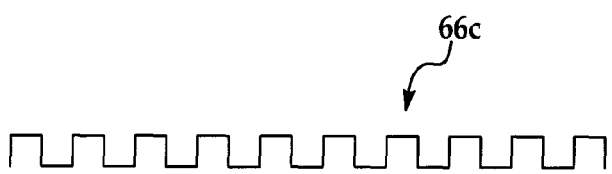
FIG. 9A  FIG. 9B
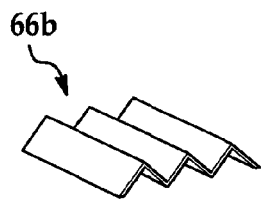
FIG. 10A  FIG. 10B
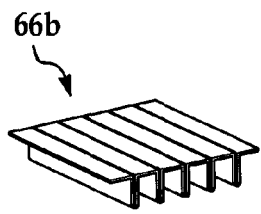
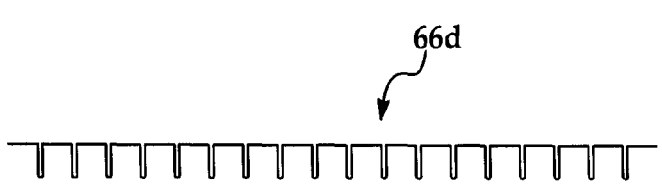
FIG. 11A  FIG. 11B

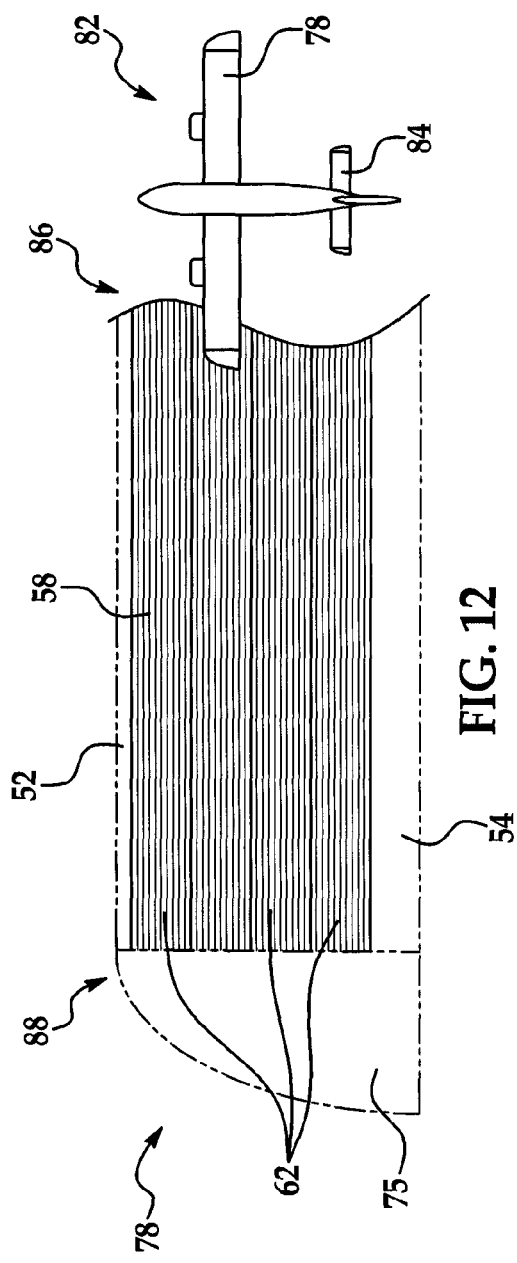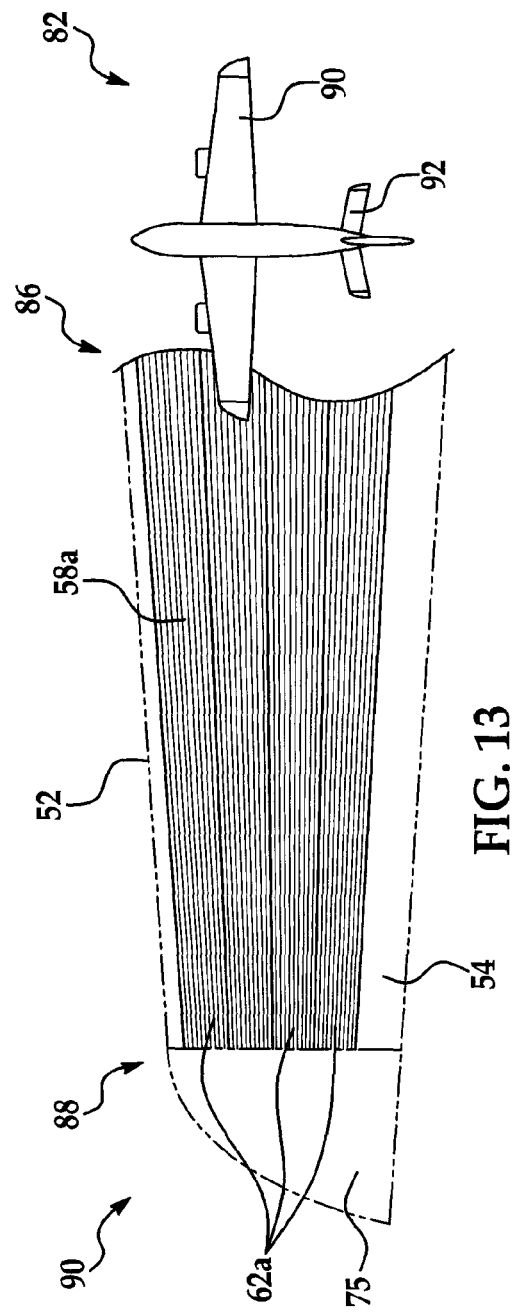

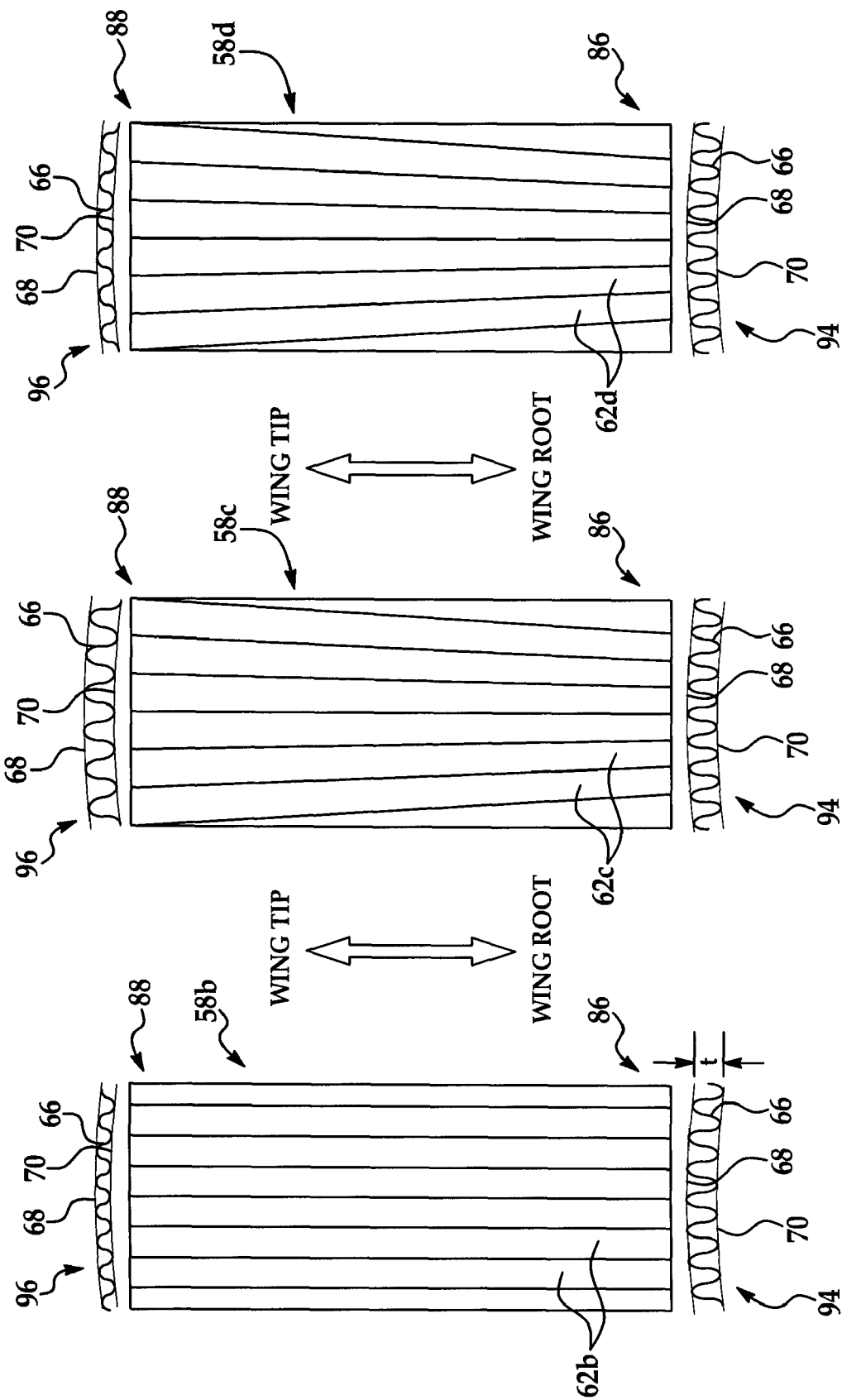

AIRCRAFT WINGS HAVING CONTINUOUSLY TAILORED STRUCTURAL STRENGTH

FIELD OF THE INVENTION

This disclosure generally relates to structures having features tailored to match design loads, and deals more particularly with structures for aircraft such as wings having continuously tailored structural strength along their lengths that more closely match imposed wing loads.

BACKGROUND OF THE INVENTION

Certain structures used in aircraft, such as, without limitation, wings, horizontal and vertical stabilizers, fins and the like are often designed to meet or exceed certain design loads. For example, existing metallic wing structures attach a number of discrete, custom manufactured, spanwise stiffeners to thickness tapered skins. The stiffeners and the skin combine at any given buttline cross sectional location to provide at least enough structural material to resist the load on the wing. A maximum number of the stiffeners are used at the wing root where the end load is highest, but the number of stiffeners and/or their thickness is reduced, usually one at a time, going outboard from the root to the tip in order to reduce the structural strength of the wing in a stepwise fashion which roughly matches the continuously reduced loads on the wing from the root to the tip. Skin thickness may also be reduced in a stepwise manner on the outboard portions of the wing. Because the stiffeners and/or the skin are reduced in discrete steps along the length of the wing, the structural strength of the wing may not be closely matched to wing load requirements, thus resulting in overstrength and/or overweight at some locations along the length of the wing.

Adding or deleting discrete stiffeners in order to provide a more exact match between varying structural strength and load requirements may not be feasible in some applications because of the expense of manufacturing and installing the stiffeners, which are relatively complex. Moreover, the use of additional ribs and stiffeners in order to meet load demands may result in weight penalties that reduce cruise efficiency of the aircraft. Finally, existing processes for fabricating wing skins rely on the use of discrete fasteners to attach each stiffener to the wing skin, thereby adding labor and material costs related to drilling precision holes, multiple assembly and disassembly operations and precision fastening operations.

Accordingly, there is a need for structures such as aircraft wings having structural strength that is continuously tailored along their lengths to more precisely match load requirements.

SUMMARY OF THE INVENTION

In accordance with the disclosed embodiments, a structure such as an aircraft wing is formed from a plurality of skin panels each having structural strength or stiffness that varies substantially continuously along its length. The skin panel may be formed from metal and/or composite materials, and include a stiffer web sandwiched between and joined to a pair of facesheets. The panels may be formed using a continuous process without the need for discrete fasteners and with fewer chordwise ribs. The stiffener web and/or each of the facesheets includes at least one dimension that is continuously varied along the length of the wing in order to provide structural strength that smoothly changes along the length of the wing and thus more closely matches the constantly varying load on the wing. The process for forming the wing reduces both labor and material costs and is well adapted for producing a variety of wings, stabilizers, fins, fuselage sections and similar structures where tailoring of structural strength is desirable.

The disclosed wing skin reacts spanwise bending of the wing, which results in either axial tension or compression of the skin. The facesheets and the web essentially act as a single unit or as a thick beam. The panel skin thickness, the web thickness, depth, waveform shape and wavelength all may be varied along the length of the span of the wing to correspond to and react to the imposed loads.

According to one disclosed embodiment, a load tailored structure comprises first and second facesheets; and, a web sandwiched between and joined to facesheets, where the web has a length and at least one dimension that continuously varies along substantially the entire length of the web. The web may include a cross section having a repeating pattern, and the continuously varying dimension may be one of the wavelength of the repeating pattern, the thickness of the web, the width of the web or the height of the web.

According to another disclosed embodiment, a skin for an aircraft wing comprises: first and second facesheets; and, a web sandwiched between and fastened to each of the facesheets for stiffening the skin. The web has at least one geometric feature that varies substantially continuously along at least a portion of the length of the wing and tailors the load bearing capacity of the wing along the portion of the length. The web may have a repeating pattern comprising one of a sine wave, a sawtooth wave, a square wave, a hat wave and a T-wave. The facesheets and/or the web may comprise a metal and/or composite material.

According to a further disclosed embodiment, an aircraft wing comprises: a plurality of panels joined together along their lengths, wherein each of the panels include inner and outer facesheets and a stiffener web sandwiched between inner and outer facesheets. The web has a stiffness that varies substantially continuously along at least a portion of the length of the panel. The wing may further comprise a wall between adjacent ones of the panels wherein the edges of the facesheets of adjacent panels are each joined to the wall.

In accordance with another disclosed embodiment, a process is provided for manufacturing an aircraft wing, comprising: fabricating a plurality of panels and joining the panels together, wherein each of the panels is fabricated by forming an elongate web including varying at least one dimension of the web substantially along its entire length, placing the web between two facesheets, and joining the facesheets to the web. Forming the web may include forming a sheet of material into a shape having a cross sectional pattern that repeats across the width of the web. Varying at least one dimension of the web substantially along its entire length may include varying at least one of the wavelength of the repeating pattern, the thickness of the web, the width of the web, and the height of the web. The panel may be shaped by shaping the facesheets of the web before the facesheets are joined to the web.

The disclosed embodiments satisfy the need for a wing whose structural strength varies continuously along its length and may be formed from skin panels joined together without the need for fasteners.

Other features, benefits and advantages of the disclosed embodiments will become apparent from the following description of embodiments, when viewed in accordance with the attached drawings and appended claims

BRIEF DESCRIPTION OF THE ILLUSTRATIONS

FIGS. 7a-11a are perspective views of alternate embodiments of the web.

FIGS. 7b-11b are end views of the webs respectively shown in FIGS. 7a-11a.

FIG. 12 is a diagrammatic view showing wings and horizontal stabilizers of an airplane in which the panels forming the skin are substantially of uniform width.

FIG. 13 is a view similar to FIG. 12 but showing the use of tapered panels forming a tapered skin.

FIGS. 14-16 illustrate alternate embodiments of wing skin configurations.

DETAILED DESCRIPTION OF THE PREFERRED EMBODIMENT

Figure 1:
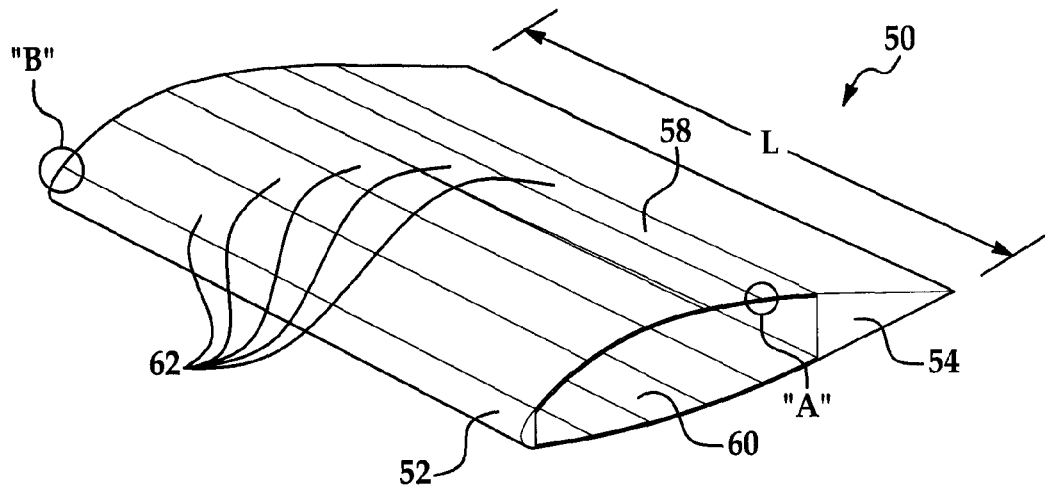
FIG. 1 is a perspective view of a section of a wing having continuously varying structural strength along its length.

Referring first to FIGS. 1-6, the disclosed embodiments relate to a structure such as an aircraft wing section 50 having structural strength or stiffness that varies continuously substantially along its entire length "L", so as to closely match design loads for the wing. The length L may comprise the entire length of a wing (not shown) or only a portion of the wing length. For example, the structural strength of a wing section 50 may vary continuously from root to tip, interrupted only by load features of the wing such as engine struts.

The wing section 50 may include leading edge structure 52 and trailing edge structure 54 formed in a conventional manner. The leading edge and trailing edge structures 52, 54 are connected by upper and lower wing skins 58, 60 respectively comprising a plurality of elongate skin panels 62 joined together along their edges. The upper and lower skins 58, 60 form a region of use 64 in which the skins 58, 60 provide structural strength or stiffness that varies continuously along the length of the wing section 50 and is closely matched to the design load requirements of the wing section 50. The wing section 50 may include internal structure (not shown) for providing additional chordwise or spanwise stiffness, as may be required for the particular application. As will be discussed below in more detail, the wing skins 58, 60 may be formed from any of various materials, including metals, composites and combinations thereof.

Figure 2:
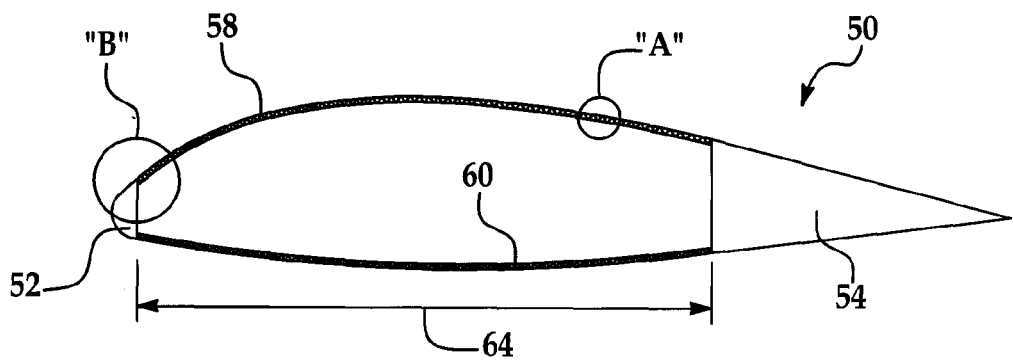
FIG. 2 is an end view of the wing section shown in FIG. 1.
Figure 3:
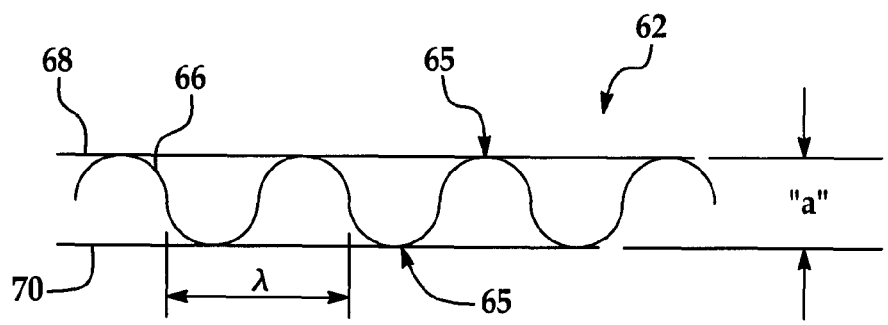
FIG. 3 is a cross sectional view of one of a portion of one of the panels forming the wing section shown in FIGS. 1 and 2.

As shown in FIG. 3, each of the panels 62 comprises a stiffener web 66 sandwiched between and joined to outer and inner facesheets 68, 70. The web 66 includes a corrugated-like, repeating pattern across the width of the panel 62, viewed from an end of the wing section 50, as shown in FIG. 2. In the embodiment illustrated in FIGS. 1-6, the repeating pattern of the web 66 is an undulating sine wave, however as will be discussed below, a variety of other repeating patterns are possible. The repeating pattern of the web 66 has a wavelength λ and an amplitude "a" which may be substantially equal to the spacing between facesheets 68, 70. The web 66 may be joined to the facesheets 68, 70 at alternating upper and lower contact points 65 using any of various techniques discussed below.

Figure 4:
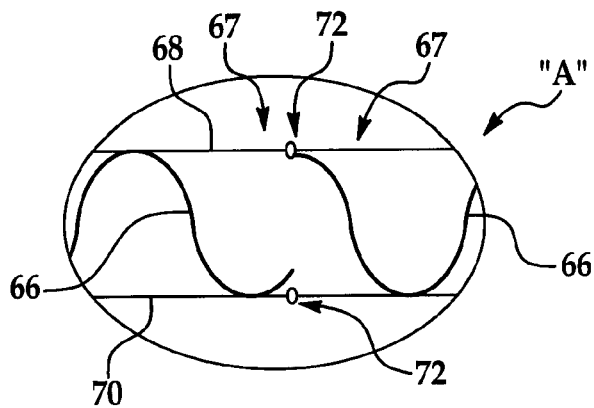
FIG. 4 is an enlarged view of the area designated as "A" shown in FIGS. 1 and 2.

FIG. 4 illustrates a typical joint between adjacent panels 62 in which adjacent edges 67 of facesheets 68, 70 are connected by welds 72.

Figure 5:
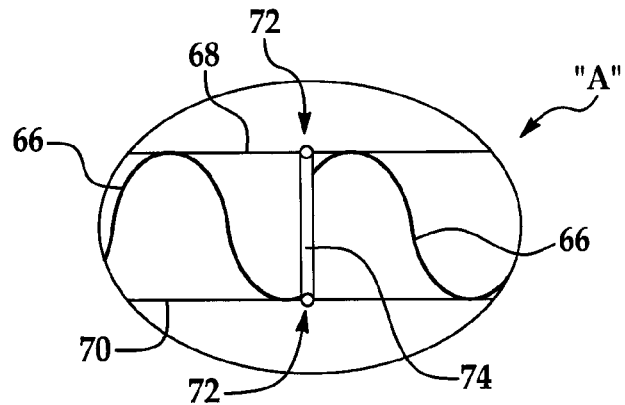
FIG. 5 is a view similar to FIG. 4 but showing an alternate embodiment of the skin.

FIG. 5 illustrates an alternate joint between adjacent panels 62 in which a web or wall 74 running substantially the entire length of the panel 62 is welded to each of the facesheets 68, 70. The wall 74, which extends traverse to the facesheets 68, 70 may comprise a discrete member, or may comprise a tab that is formed by bending an edge of either one of the facesheets 68, 70 on one of the panels 62. The wall may be joined to each of the webs 66, if desired in order to increase the stiffness of the resulting joint.

Figure 6:
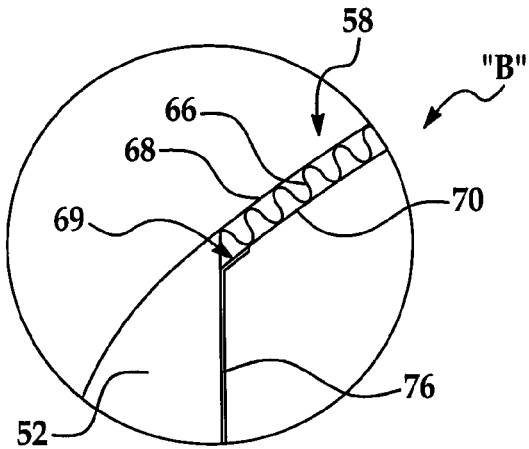
FIG. 6 is an enlarged view of the area designated as "B" in FIGS. 1 and 2.

FIG. 6 illustrates how a front spar 76 of the leading edge structure 52 may be integrated into the upper wing skin 58. A tab 69 forming part of the front spar 76 is angled so as to extend generally parallel to the contour of the skin 58 and may be joined to the lower facesheet 70.

As previously noted, the web 66 may possess any of a variety of repeating patterns across the width of each panel 62, and includes at least one dimension or geometric feature that varies substantially continuously along the length L of the panel 62 (FIG. 1) in order to provide continuously varying stiffness that closely matches the profile of design load along the length L of wing section 50. Thus, as used herein, "repeating pattern" means a pattern which is generally repeating but with variations in one of more characteristics of the pattern. FIGS. 7a and 7b illustrate a web 66a having a hat-shaped repeating pattern with a constant wavelength λ, while FIGS. 8a and 8b illustrate a web 66b illustrating a sine wave pattern. FIGS. 9a and 9b illustrate a web 66c having a square wave pattern while FIGS. 10a and 10b illustrate a web 66d having a sawtooth wave pattern. Finally, FIGS. 11a and 11b illustrate a web 66e having a repeating T-shape wave. While the wavelengths of the webs 66a-66e described above are constant, it is also possible to employ a wavelength λ that varies along the length L of the wing section 50, as will be described below.

FIG. 12 illustrates an airplane 82 having wings 78 and horizontal stabilizers 84 employing a wing skin 58 exhibiting continuously varying stiffness along its length. The wing 78 comprises leading and trailing edge structures 52, 54 and a wing tip structure 75, all joined to a series of wing skin panels 62 having substantially uniform width from the root 86 to the tip 88 of the wing 78. Thus, wing 78 possesses a substantially non-tapered wing skin 58. In contrast, as shown in FIG. 13, an airplane 82 includes wings 90 and horizontal stabilizers 92 that have a tapered wing skin 58a, resulting from the use of wedge shaped wing skin panels 62a that taper from the root 86 to the outer tip 88 of the wing 90.

Reference is now made to FIG. 14 which illustrates an alternate embodiment of the wing skin 58b formed of panels 62b having substantially uniform width, and a depth or thickness "t" that continuously varies from the wing root 86 to the wing tip 88. The cross section of the wing skin 58b adjacent the wing root 86 is indicated by the numeral 94, while the cross section at the wing tip 88 is designated by the numeral 96. As is evident from the cross sections 94, 96, the amplitude of the web 66, which in the illustrated example is a sine wave, decreases continuously along the length of the wing skin 58b, from the root 86 to the tip 88.

FIG. 15 illustrates a wing skin 58c in which continuously varying structural strength along the length of the wing skin 58c is achieved by continuously varying the wavelength λ of the sine wave pattern of the web 66, from the wing root 86 to the wing tip 88. In the illustrated example, greater structural strength at the wing root 86 is achieved by using a shorter wavelength web 66 while the web 66 near the wing tip 88 has a longer wavelength. This variation in wavelength λ of the web 66 from the root 86 to the tip 88 results in wing skin panels 62c that are generally tapered, with the peaks of the web 66 being closer together at the wing root 86 than at the wing tip 88.

FIG. 16 illustrates a wing skin 58d that employs the techniques of the wing skins 58b, 58c respectively shown in FIGS. 14 and 15. Each of the wing skin panels 62d of the wing skin 58d employ a web 66 that continuously varies both in the wavelength λ and amplitude "a" (see FIG. 3) of the sine wave pattern from root 86 to tip 88. More specifically, the wavelength λ increases from root 86 to tip 88, while the amplitude "a" decreases from root 86 to tip 88. Other geometric features or dimensions of the web 66 may be continuously varied along the length of the wing skin 58 in order to provide a structural strength profile that closely matches the designed load profile of the wing. For example, the thickness of the material from which the web 66 is formed may be continuously varied along the length of the wing skin 58. Also, the thickness of the facesheets 68 70, may be continuously varied along the length of the wing skin 58, from root 86 to tip 88.

Figure 17:
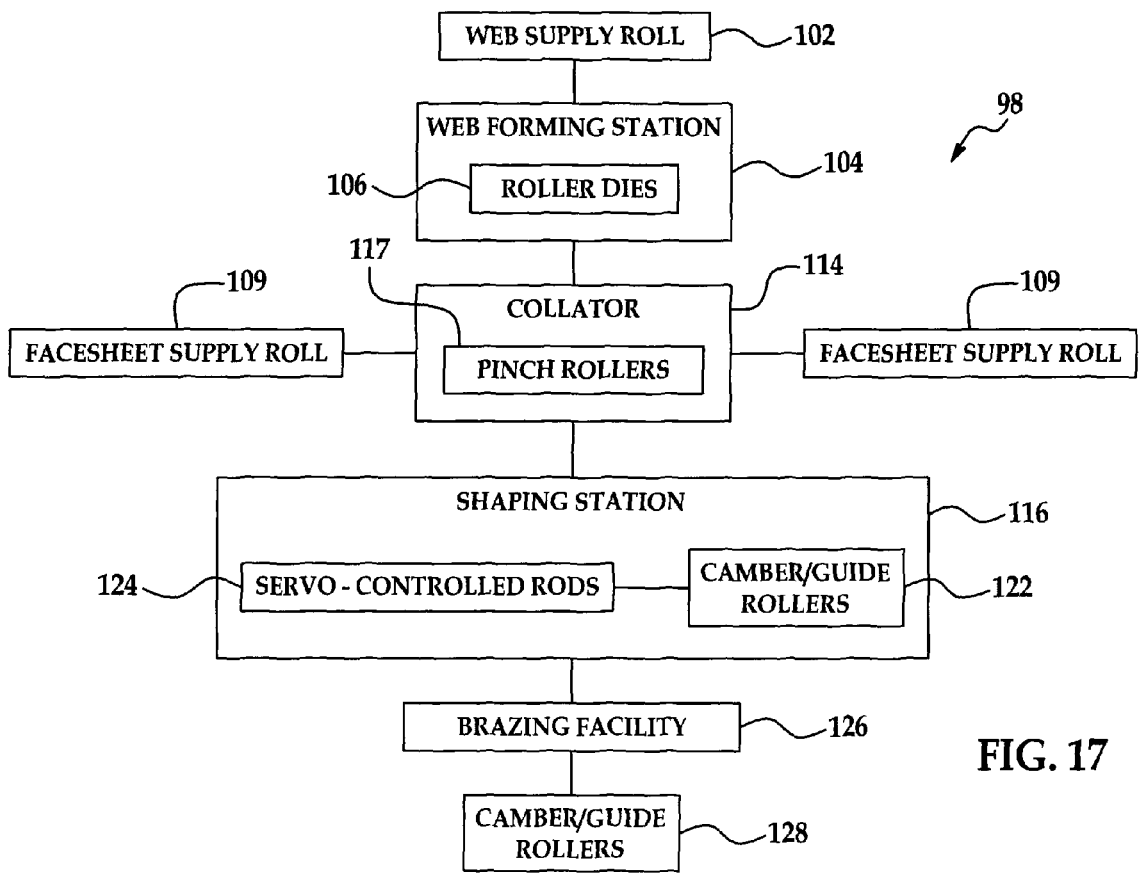
FIG. 17 is a functional block diagram of apparatus for forming the wing skin panels.
Figure 18:
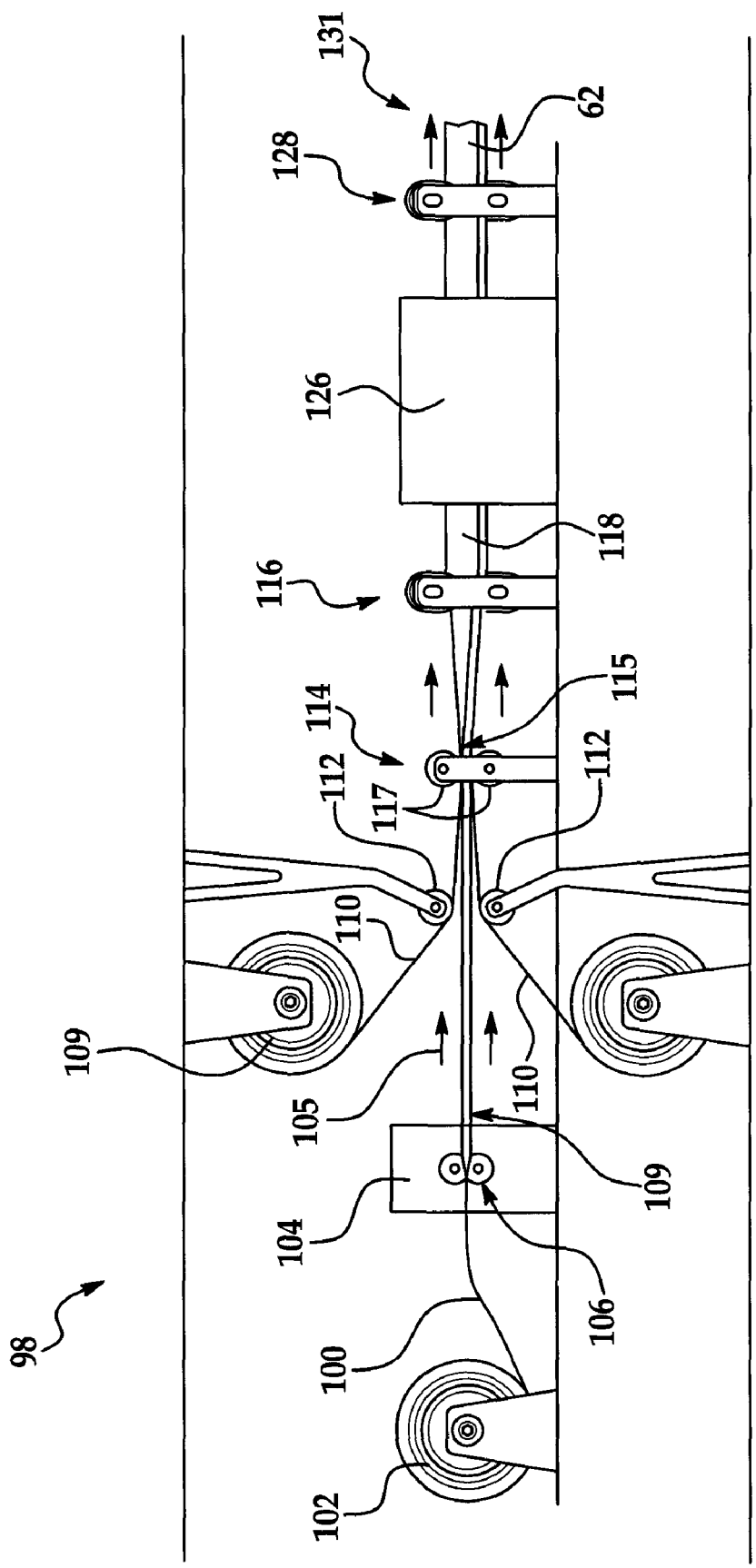
FIG. 18 is a side view illustrating a process and apparatus for forming the wing skin panels.
Figure 19:
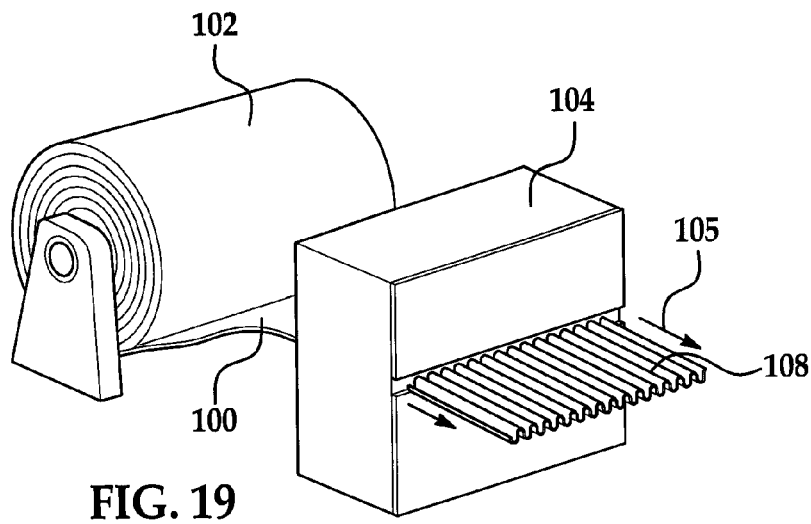
FIGS. 19-22 are perspective views details of the apparatus shown in FIG. 17.

The wing skin panels 62 described above may be fabricated using apparatus and a process generally indicated by the numeral 98 in FIGS. 17 and 18. Referring now to FIGS. 17-19, sheet material 100, which may comprise, for example and without limitation, metal, is drawn from a supply roll 102 and is passed through a web forming station 104 which may include roller dies 106 or similar tooling that squeezes and deforms the sheet material 100 so as to impart a repeating pattern to the sheet material 100. The repeating pattern matches the geometry of the roller dies 106 which can be varied so as to vary characteristics of the pattern, such as the wavelength λ and the amplitude "a". The dimensions of the resulting web 66 are controlled by the web forming roller dies 106 which produce the variations in a continuous, preprogrammed way, resulting in a load tailored core in a single step. Additional details of a suitable web forming station 104 are described in U.S. Pat. No. 6,834,525 issued Dec. 28, 2004. The width and thickness of the sheet material 100 may be determined before processing is commenced, depending upon the requirements of the application. In some applications, the sheet material 100 may be preformed with varying thickness and/or width before being placed on the supply roll 102. For example, the metal sheet material 100 may be rolled or machined before it is passed through the forming station 104. In the case of skins formed composite materials, the web 66 may be simply be molded to facesheets having a varying thickness.

Figure 20:
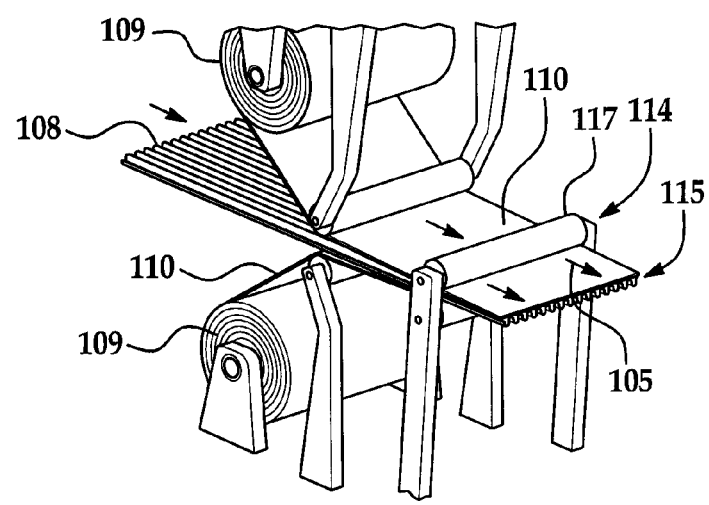
Figure 21:
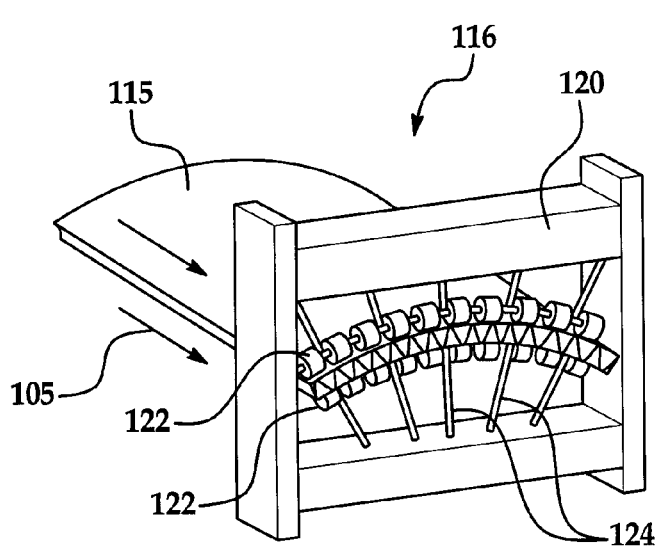

The formed web 108 moves from the forming station 104 in the direction of the arrows 105 to a collimator 114 shown in FIGS. 17, 18 and 20. As the continuous web 108 is fed to the collimator 114, facesheet material 110 drawn from supply rolls 109 is guided by rollers 112 onto the upper and lower surfaces of the continuous web 108. The collimator 114 may comprise, for example and without limitation, a pair of pinch rollers 117 and related edge guides which function to draw the two continuous lengths of facesheet material 110 and the formed web 108 into a sandwich 115 that emerges from the collimator 114 and is then drawn into a shaping station 116 shown in FIGS. 17 and 20. The rollers and edge guides 117 ensure lateral alignment and keep the constant level of tension on the sheet material 100. The collimator 114 ensures that the face sheets and the web are lined up with each other laterally.

The shaping station 116 may include shaping apparatus 120 comprising, for example and without limitation, two sets of camber and guide rollers 122 which are arranged to deform the continuous sandwich 115 into the desired cross sectional shape matching the desired surface profile of the wing. The cross sectional shape of the sandwich 115, and thus the surface contour of the resulting wing skin is determined by the position of the sets of the camber and guide rollers 122 which may be varied using servo-motor controlled rods 124 or other means for altering the configuration of the sets of rollers 122.

A digital controller (not shown) may be programmed to control the servo-control rods 124 and thus the position of the rollers 122. As the panel sandwich 122 moves through the shaping station 116, the contour imparted to the sandwich 122 may change, corresponding to the change in airfoil shape along the span of the wing, except in those applications employing constant chord wing designs. Shaping of the wing skin panels 62 to match local wing surface contours may eliminate or reduce the need for ribs to maintain the shape of the wing. Moreover, fewer ribs may be required to support skin panels 62.

Figure 22:
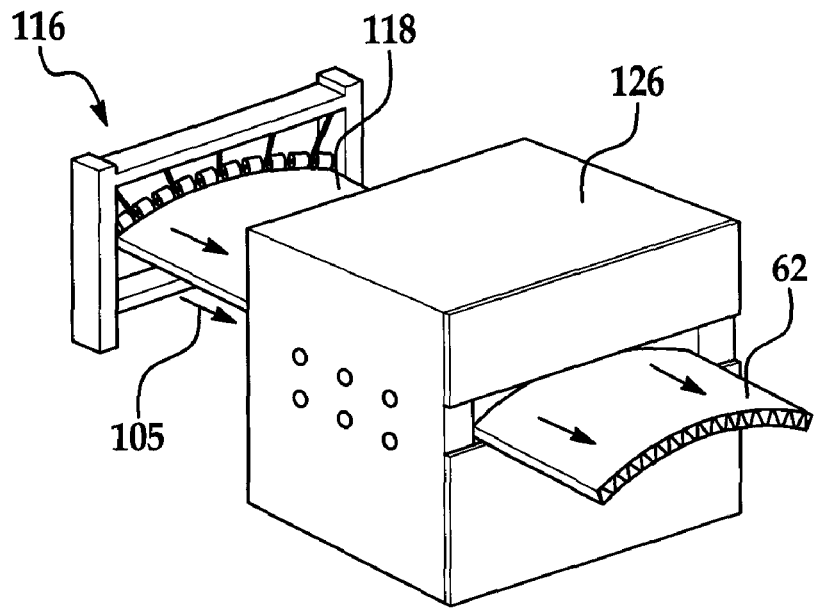

After passing through the shaping station 116, the shaped sandwich 118 is passed through a brazing facility 126, as shown in FIGS. 17, 18 and 22. The brazing facility 126 joins the web 66 to the facesheets 68, 70 by brazing, in the case of a metallic wing. Where the components of the skin panels are formed from composite material however, the components would be passed through a bonding facility (not shown), rather than the brazing facility 126. As shown in FIGS. 17 and 18, a second set of camber and guide rollers 128 may be employed to hold the shaped sandwich 118 while the brazed panel 62 is cooling. The finished wing skin panel 62 exits the apparatus 98 at 131 and may be cut to the desired shape or length using any suitable apparatus (not shown). From the foregoing, it may be appreciated that continuous, near optimal variation in the amount of structural material may be used to complete the wing skins 58 in essentially a single manufacturing operation.

Figure 23:
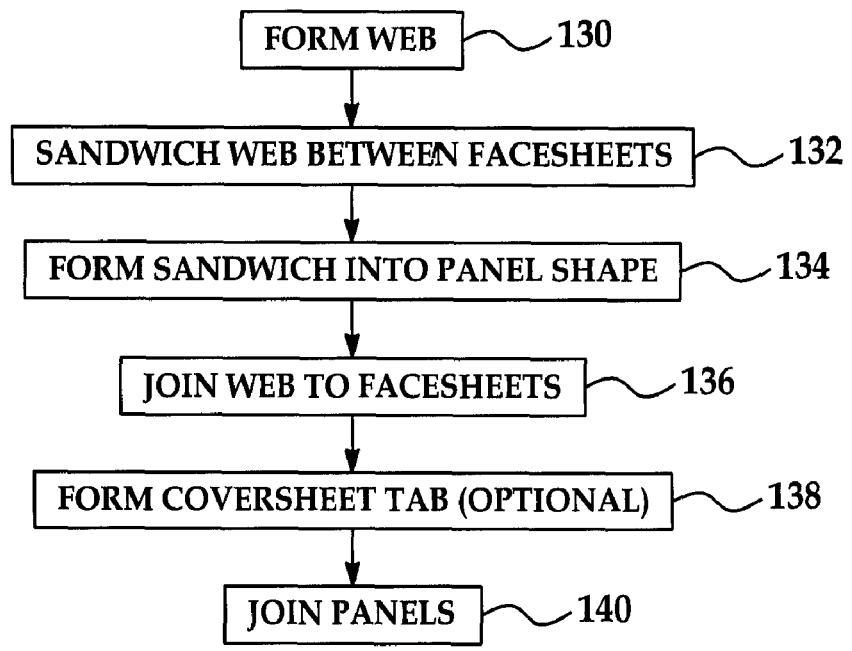
FIG. 23 is a flow diagram broadly illustrating the steps of a process for forming wings having continuously varying structural strength.

Attention is now directed to FIG. 23 which illustrates, in simplified form, a process for fabricating wing skins having continuously varying structural strength along their lengths. Beginning at 130, the web 66 is formed at a web forming station 104 (FIG. 17) or using other similar processes. Next, at 132, the web 66 is sandwiched between opposing facesheets 68, 70. The sandwich is then formed into the shape of the panel at 134 in order to achieve the desired surface contour of the skin. Then, at 136, the web 66 is joined to the facesheets 68 70. Optionally, tabs forming the wall shown in FIG. 5 may be formed on at least some of the panels as shown in step 138, following which the panels are joined together at step 140. The panels may be joined together using any of various known processes, such as, for example and without limitation, laser welding or friction stir welding.

As previously mentioned, the wing skin panels may be fabricated using composite materials. Where composite materials are used, a device (not shown) for forming the web 66 may incorporate, for example, the ability to partially cure composite core material immediately after it has been formed to the desired pitch amplitude and shape, using for example and without limitation, microwave curing. It may also be necessary or desirable to provide increased support for the shaped web during the cure stage to ensure the shape is maintained until the web is able to support itself without deformation. A suitable device (not shown) may be used to join the web to the facesheets, regardless of whether the facesheets are formed of metallic or composite materials. Such a device and related process may utilize a high strength paste adhesive and a spot or cure-on-demand curing process. Other techniques may be employed to join the web to the facesheets, depending on the materials from which they are formed, such as, without limitation, the use of selective blind fasteners and/or blind stitching. In the case of composite wing skin panels 62, the edges of the panels may be joined with adhesives using a cure-on-demand process.

Figure 24:
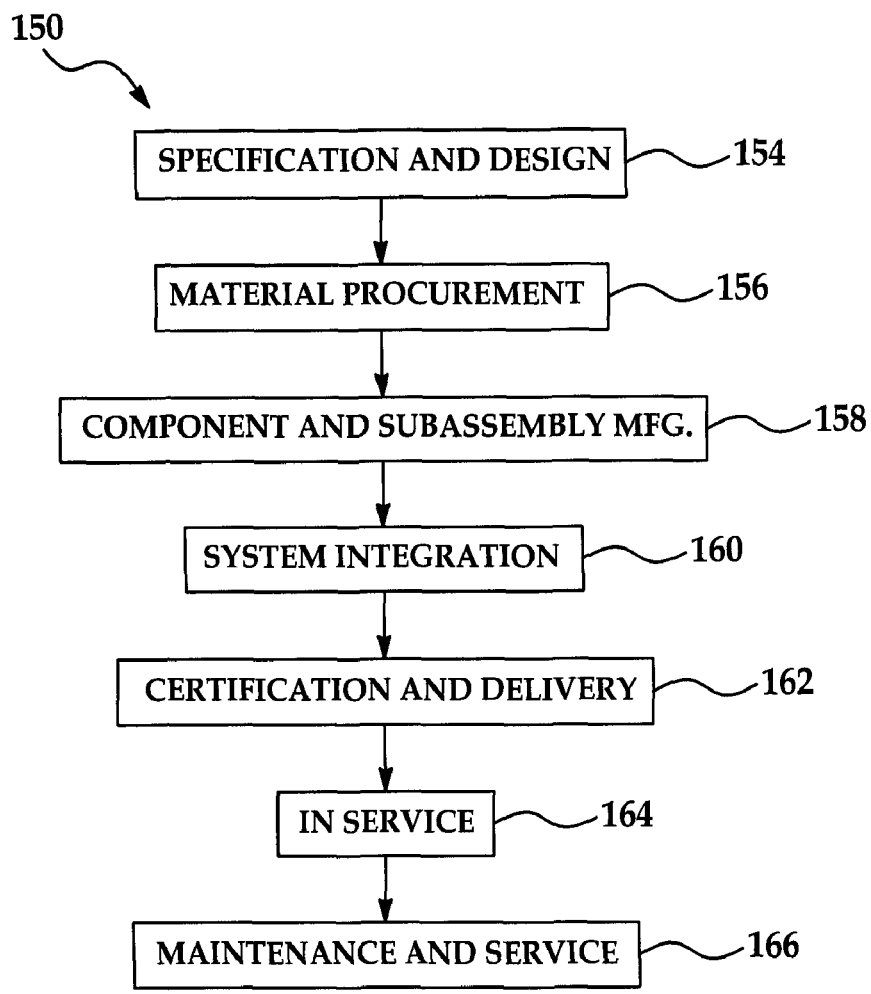
FIG. 24 is a flow diagram of aircraft production and service methodology.
Figure 25:
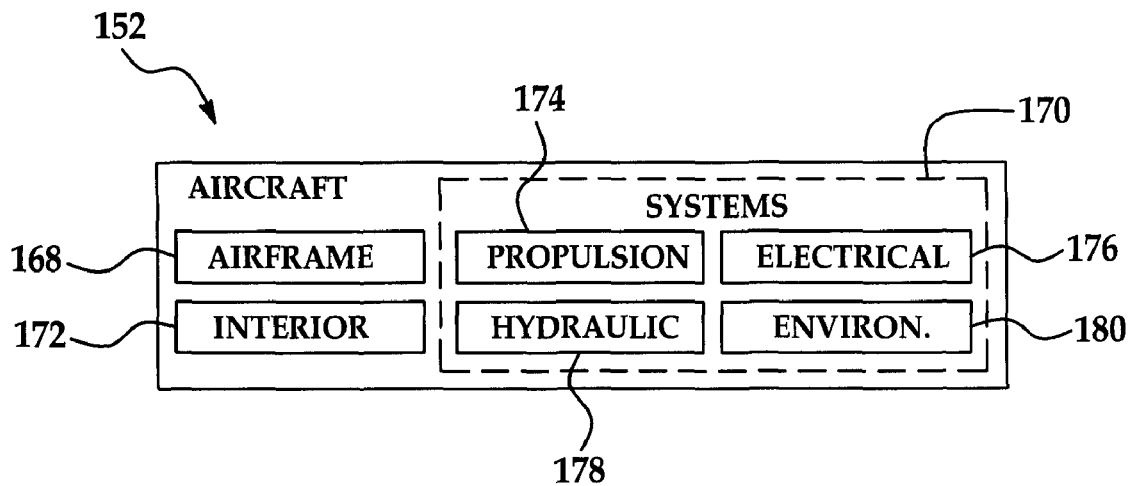
FIG. 25 is a block diagram of an aircraft.

Embodiments of the disclosure may find use in a variety of potential applications, particularly in the transportation industry, including for example, aerospace, marine and automotive applications. Thus, referring now to FIGS. 24 and 25, embodiments of the disclosure may be used in the context of an aircraft manufacturing and service method 150 as shown in FIG. 24 and an aircraft 152 as shown in FIG. 25. During pre-production, exemplary method 150 may include specification and design 154 of the aircraft 152 and material procurement 156. During production, component and subassembly manufacturing 158 and system integration 160 of the aircraft 152 takes place. Thereafter, the aircraft 152 may go through certification and delivery 162 in order to be placed in service 164. While in service by a customer, the aircraft 152 is scheduled for routine maintenance and service 166 (which may also include modification, reconfiguration, refurbishment, and so on).

Each of the processes of method 150 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 25, the aircraft 152 produced by exemplary method 150 may include an airframe 168 with a plurality of systems 170 and an interior 172. Examples of high-level systems 170 include one or more of a propulsion system 174, an electrical system 176, a hydraulic system 178, and an environmental system 180. Any number of other systems may be included. Although an aerospace example is shown, the principles of the disclosure may be applied to other industries, such as the marine, automotive and construction industries.

Systems and methods embodied herein may be employed during any one or more of the stages of the production and service method 150. For example, components or subassemblies corresponding to production process 150 may be fabricated or manufactured in a manner similar to components or subassemblies produced while the aircraft 152 is in service. Also, one or more apparatus embodiments, method embodiments, or a combination thereof may be utilized during the production stages 158 and 160, for example, by substantially expediting assembly of or reducing the cost of an aircraft 152. Similarly, one or more of apparatus embodiments, method embodiments, or a combination thereof may be utilized while the aircraft 152 is in service, for example and without limitation, to maintenance and service 166.

Although the embodiments of this disclosure have been described with respect to certain exemplary embodiments, it is to be understood that the specific embodiments are for purposes of illustration and not limitation, as other variations will occur to those of skill in the art. For example, while the disclosed embodiments illustrate a wing, other structures forming part of an aircraft may advantageously employ the disclosed features, such as, for example and without limitation, fuselage sections, especially where the design load on the fuselage varies, as in tapered sections of the fuselage.

What is claimed is:

1. A load tailored structure, comprising:
a plurality of elongate skin panels, each skin panel extending from a root position to a tip position in a lengthwise direction of the skin panels, the plurality of elongate skin panels joined at a set of edges to form the structure;
the strength of at least one panel in the plurality of elongate skin panels being stronger at the root position than at the tip position.
at least one panel in the plurality of elongate skin panels comprising:
first and second facesheets; and
a single web sandwiched between and joined to the facesheets, the web having a length, the web comprising a material configuration that continuously varies in the lengthwise direction from the root position to the tip position,
the structure comprising a wing, a stabilizer, or a fin.

2. The load tailored structure of claim 1, wherein:
the web includes a cross section having a repeating pattern that repeats in a width direction transverse to the length of said tailored structure.

3. The load tailored structure of claim 2, wherein the dimension is one of:
the wavelength of the repeating pattern,
the thickness of the web,
the width of the web, and
the height of the web.

4. The load tailored structure of claim 1, wherein the web has a cross sectional shape, and the cross sectional shape is one of:
a sine wave,
a sawtooth wave,
a square wave,
a hat wave, and
a T-wave.

5. The load tailored structure of claim 1, wherein the web has first and second ends and is tapered from the first end to the second end.

6. The load tailored structure of claim 1, wherein the first and second facesheets are formed of composite materials.

7. A skin for an aircraft wing, comprising:
a plurality of skin panels, the skin panels extending in a lengthwise direction from a root position of the wing to a tip position of the wing, the skin panels joined at a set of edges to form the skin, at least one skin panel in the plurality of skin panels comprising:
first and second facesheets; and
a single web sandwiched between and fastened to each of the facesheets for stiffening the skin, the web having at least one geometric feature comprising a dimension that varies substantially continuously along the lengthwise direction of the wing so as to continuously tailor a load bearing capacity of the wing between the root position and the tip position.

8. The skin of claim 7, wherein:
the web includes a cross section having a pattern that repeats in a width direction transverse to the length of said wing.

9. The skin of claim 8, wherein the repeating pattern is one of:
a sine wave,
a sawtooth wave,
a square wave, a hat wave, and
a T-wave.

10. The skin of claim 7, wherein the geometric feature dimension is one of:
the wavelength of the repeating pattern,
the thickness of the web,
the width of the web, and
the height of the web.

11. The skin of claim 7, wherein the web comprises metal.

12. The skin of claim 11, wherein each of the first and second facesheets comprises metal.

13. The skin of claim 11, wherein each of the first and second facesheets comprises a fiber reinforced composite material.

14. The skin of claim 7, wherein each of the web, and the first and second facesheets comprises a fiber reinforced composite material.

15. The skin of claim 7, wherein one of the first and second face sheets defines a contoured surface of the wing.

16. An aircraft wing, comprising:
a plurality of elongate panels joined together along their lengths,
each of the panels including comprising:
inner and outer composite facesheets, and
a composite stiffener comprising a single web sandwiched between and joined to the inner and outer facesheets,
the web having stiffness associated with a web dimension, said dimension and stiffness varying substantially continuously in a length direction along at least a portion of the length of the panel,
the web comprising a repeating pattern of material that varies in one of wavelength or amplitude along the length direction.

17. The aircraft wing of claim 16, wherein each of the inner and outer face sheets includes edges and the panels are joined together along the edges of the facesheets.

18. The aircraft wing of claim 17, further comprising:
a wall between adjacent ones of the panels, and
wherein the edges of the facesheets of adjacent panels are joined to the wall.

19. The aircraft wing of claim 16, wherein at least certain ones of the panels have a width that is tapered along the length of the panel.

20. The aircraft wing of claim 16, wherein:
the web includes a cross section having the pattern of material that repeats in a width direction transverse to the length of said wing.

21. A process for manufacturing an aircraft wing, comprising:
fabricating a plurality of panels, each of the panels being fabricated by
forming an elongate single web, the web comprising a material with a repeating configuration that varies in one of amplitude or wavelength in a length direction substantially along its entire length,
placing the web between two facesheets, and
joining the facesheets to the web; and
joining the panels together.

22. The process of claim 21, wherein:
forming the web includes forming a sheet of material into a shape having a cross sectional pattern that repeats in a width direction transverse to the length of said wing.

23. The process of claim 21, further comprising:
shaping each of the panels by shaping the facesheets and the web before the facesheets are joined to the web.

24. A process for manufacturing an aircraft wing having a load capacity tailored along its length, comprising:
fabricating a plurality of panels, each of the panels being fabricated by
forming an single elongate web, the web comprising a material with a repeating pattern that varies in one of amplitude or wavelength along a length of the wing from a root position to a tip position,
assembling the web between two facesheets, shaping the assembly of the web and the face sheets into a desired cross sectional shape, said cross sectional shape having said repeating pattern that repeats in a width direction transverse to the length of said tailored structure and
joining the facesheet to the web; and
joining the panels together.

25. An aircraft wing having a load capacity tailored along its length, comprising:
a skin including a plurality of panels joined together along their lengths,
each of the panels including
inner and outer facesheets, and
a single stiffening web sandwiched between and joined to the inner and outer facesheets, the web having a repeating pattern, that repeats in a width direction transverse to the length of said tailored structure, at least one of
the wavelength of the repeating pattern, and
the thickness of the web,
the repeating pattern varying continuously along the length of the panel.

* * * * *